United States Patent
Cheung (10) Patent No.: US 6,781,601 B2
(45) Date of Patent: Aug. 24, 2004

(54) TRANSPORT PROCESSOR

(75) Inventor: Francis Cheung, Del Mar, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 10/068,579

(22) Filed: Feb. 5, 2002

(65) Prior Publication Data

US 2002/0093517 A1 Jul. 18, 2002

Related U.S. Application Data

(63) Continuation of application No. 09/969,212, filed on Oct. 2, 2001, application No. 10/068,579, which is a continuation of application No. 09/640,869, filed on Aug. 18, 2000, now Pat. No. 6,538,656, which is a continuation-in-part of application No. 09/437,208, filed on Nov. 9, 1999, now Pat. No. 6,570,579, application No. 10/068,579, which is a continuation of application No. 09/641,374, filed on Aug. 18, 2000, which is a continuation-in-part of application No. 09/437,208.

(60) Provisional application No. 60/266,753, filed on Feb. 5, 2001, provisional application No. 60/170,866, filed on Dec. 14, 1999, and provisional application No. 60/170,866.

(51) Int. Cl.$^7$ .............................................. H04N 7/12

(52) U.S. Cl. ................ 345/629; 348/385.1; 348/388.1; 370/348; 370/431

(58) Field of Search ........................... 345/637, 638; 348/14.01, 14.02, 156, 385.1, 388.1, 394.1, 552; 725/6, 28, 54, 116, 37, 100, 105, 107, 109–110, 132–134, 114, 91; 370/312, 319, 348–349, 389, 394, 431–433, 437, 443, 445, 461–462, 487, 488, 514, 335, 342, 441; 709/217, 223, 227, 230, 231, 237, 203; 375/130, 140, 142

(56) References Cited

U.S. PATENT DOCUMENTS

| | | | |
|---|---|---|---|
| 4,020,332 A | 4/1977 | Crochiere et al. | ........... 235/152 |
| 4,367,466 A | 1/1983 | Takeda et al. | ............... 340/725 |

(List continued on next page.)

FOREIGN PATENT DOCUMENTS

| | | | | |
|---|---|---|---|---|
| EP | 0656708 A1 | * | 3/1993 | ............. H04L/9/08 |
| EP | 0746116 A2 | | 12/1996 | ............. H04B/1/66 |
| EP | 0 752 695 | | 1/1997 | ............. G09G/1/16 |
| EP | 0840276 A2 | | 5/1998 | ............. G09G/5/14 |
| EP | 0840277 A2 | | 5/1998 | ............. G09G/5/14 |
| EP | 0 840 505 | | 5/1998 | ............. H04N/5/45 |
| GB | 2287627 A | | 5/1995 | ............. G06T/1/60 |
| JP | 2000196586 | | 7/2000 | ............. H04L/9/18 |
| WO | WO 94/10641 | | 5/1994 | ............ G06F/15/62 |
| WO | WO 00/28518 | | 5/2000 | ............. G09G/5/14 |
| WO | 00/49825 | * | 8/2000 | ............. H04Q/7/38 |

OTHER PUBLICATIONS

Sun, Huifang et al., "A New Approach for Memory Efficient ATV Decoding," 1977 IEEE International Conference on Consumer Electronics, pp. 174–175, Los Angeles, 1997.

(List continued on next page.)

*Primary Examiner*—Matthew C. Bella
*Assistant Examiner*—Wesner Sajous
(74) *Attorney, Agent, or Firm*—McAndrews, Held & Malloy, Ltd.

(57) ABSTRACT

The present invention relates to a system and method for processing information, specifically data packets. One embodiment of the present invention relates to a method for processing information, comprising determining if a first identifier associated with the information is acceptable and assigning a second identifier to the information. The method further includes determining a type of processing that is required using the second identifier and performing that type of processing on the information.

19 Claims, 6 Drawing Sheets

U.S. PATENT DOCUMENTS

| | | | |
|---|---|---|---|
| 4,532,547 A | 7/1985 | Bennett | 358/148 |
| 4,679,040 A | 7/1987 | Yan | 340/747 |
| 4,688,033 A | 8/1987 | Carini et al. | 340/800 |
| 4,959,718 A | 9/1990 | Bennett | 358/148 |
| 5,043,714 A | 8/1991 | Perlman | 340/750 |
| 5,097,257 A | 3/1992 | Clough et al. | 340/814 |
| 5,142,273 A | 8/1992 | Wobermin | 340/703 |
| 5,148,417 A | 9/1992 | Wong et al. | 369/32 |
| 5,155,816 A | 10/1992 | Kohn | 395/375 |
| 5,258,747 A | 11/1993 | Oda et al. | 345/153 |
| 5,262,854 A | 11/1993 | Ng | 358/133 |
| 5,307,177 A | 4/1994 | Shibata et al. | 358/430 |
| 5,371,877 A | 12/1994 | Drako et al. | 395/425 |
| 5,384,912 A | 1/1995 | Ogrinc et al. | 395/164 |
| 5,396,567 A | 3/1995 | Jass | 382/56 |
| 5,398,211 A | 3/1995 | Willenz et al. | 365/230 |
| 5,418,535 A | 5/1995 | Masucci et al. | 342/185 |
| 5,420,866 A * | 5/1995 | Wasilewski | 370/426 |
| 5,422,858 A | 6/1995 | Mizukami et al. | 365/233 |
| 5,432,769 A | 7/1995 | Honjo | 369/60 |
| 5,432,900 A | 7/1995 | Rhodes et al. | 345/154 |
| 5,434,683 A | 7/1995 | Sekine et al. | 358/520 |
| 5,434,957 A | 7/1995 | Moller | 395/131 |
| 5,467,144 A | 11/1995 | Saeger et al. | 348/566 |
| 5,469,223 A | 11/1995 | Kimura | 348/581 |
| 5,471,411 A | 11/1995 | Adams et al. | 364/724.01 |
| 5,488,385 A | 1/1996 | Singhal et al. | 345/3 |
| 5,515,077 A | 5/1996 | Tateyama | 345/153 |
| 5,526,054 A | 6/1996 | Greenfield et al. | 348/467 |
| 5,533,182 A | 7/1996 | Bates et al. | 395/155 |
| 5,539,891 A | 7/1996 | Childers et al. | 395/405 |
| 5,546,103 A | 8/1996 | Rhodes et al. | 345/119 |
| 5,550,594 A | 8/1996 | Cooper et al. | 348/513 |
| 5,570,296 A | 10/1996 | Heyl et al. | 364/514 |
| 5,577,187 A | 11/1996 | Mariani | 395/342 |
| 5,592,601 A | 1/1997 | Kelley et al. | 395/143 |
| 5,598,525 A | 1/1997 | Nally et al. | 395/520 |
| 5,598,545 A | 1/1997 | Childers et al. | 395/562 |
| 5,600,364 A | 2/1997 | Hendricks et al. | 348/1 |
| 5,604,514 A | 2/1997 | Hancock | 345/154 |
| 5,610,983 A | 3/1997 | Stewart | 380/48 |
| 5,614,952 A | 3/1997 | Boyce et al. | 348/392 |
| 5,615,376 A | 3/1997 | Ranganathan | 395/750 |
| 5,619,270 A | 4/1997 | Demmer | 348/441 |
| 5,619,337 A | 4/1997 | Naimpally | 368/83 |
| 5,621,478 A | 4/1997 | Demmer | 348/639 |
| 5,621,869 A | 4/1997 | Drews | 395/135 |
| 5,621,906 A | 4/1997 | O'Neill et al. | 395/355 |
| 5,623,311 A | 4/1997 | Phillips et al. | 348/396 |
| 5,625,611 A | 4/1997 | Yokota et al. | 396/47 |
| 5,627,836 A * | 5/1997 | Conoscenti et al. | 370/397 |
| 5,635,985 A | 6/1997 | Boyce et al. | 348/402 |
| 5,638,499 A | 6/1997 | O'Connor et al. | 395/131 |
| 5,638,501 A | 6/1997 | Gough et al. | 395/135 |
| 5,640,543 A | 6/1997 | Farrell et al. | 395/502 |
| 5,664,162 A | 9/1997 | Dye | 345/521 |
| 5,694,143 A | 12/1997 | Fielder et al. | 345/145 |
| 5,696,527 A | 12/1997 | King et al. | 345/112 |
| 5,706,482 A | 1/1998 | Matsushima et al. | 396/521 |
| 5,708,764 A | 1/1998 | Borrel et al. | 395/119 |
| 5,708,961 A * | 1/1998 | Hylton et al. | 455/4.2 |
| 5,719,593 A | 2/1998 | De Lange | 345/114 |
| 5,734,589 A * | 3/1998 | Kostreski et al. | 348/6 |
| 5,742,779 A | 4/1998 | Steele et al. | 345/349 |
| 5,745,095 A | 4/1998 | Parchem et al. | 845/114 |
| 5,751,979 A | 5/1998 | McCrory | 395/343 |
| 5,758,177 A | 5/1998 | Gulick et al. | 395/800.01 |
| 5,761,516 A | 6/1998 | Rostoker et al. | 395/733 |
| 5,764,238 A | 6/1998 | Lum et al. | 345/439 |
| 5,765,010 A | 6/1998 | Chung et al. | 395/800.01 |
| 5,790,136 A | 8/1998 | Hoffert et al. | 345/506 |
| 5,790,795 A | 8/1998 | Hough | 395/200 |
| 5,790,842 A | 8/1998 | Charles et al. | 395/559 |
| 5,793,384 A | 8/1998 | Okitsu | 345/511 |
| 5,793,445 A | 8/1998 | Lum et al. | 348/720 |
| 5,802,579 A | 9/1998 | Crary | 711/149 |
| 5,815,137 A | 9/1998 | Weatherford et al. | 345/145 |
| 5,828,383 A | 10/1998 | May et al. | 345/546 |
| 5,831,615 A | 11/1998 | Drews et al. | 345/344 |
| 5,838,678 A * | 11/1998 | Davis et al. | 370/389 |
| 5,844,608 A | 12/1998 | Yu et al. | 348/390 |
| 5,854,761 A | 12/1998 | Patel et al. | 365/49 |
| 5,864,345 A | 1/1999 | Wickstrom et al. | 345/431 |
| 5,867,166 A | 2/1999 | Myhrvold et al. | 345/419 |
| 5,874,967 A | 2/1999 | West et al. | 345/435 |
| 5,889,949 A | 3/1999 | Charles | 395/200.44 |
| 5,894,300 A | 4/1999 | Takizawa | 345/601 |
| 5,896,136 A | 4/1999 | Augustine et al. | 345/431 |
| 5,903,281 A | 5/1999 | Chen et al. | 345/504 |
| 5,907,295 A | 5/1999 | Lin | 341/61 |
| 5,907,635 A | 5/1999 | Numata | 382/233 |
| 5,914,725 A | 6/1999 | MacInnis et al. | 345/441 |
| 5,914,728 A | 6/1999 | Yamagishi et al. | 345/565 |
| 5,920,572 A * | 7/1999 | Washington et al. | 370/535 |
| 5,923,316 A | 7/1999 | Kitamura et al. | 345/603 |
| 5,923,385 A | 7/1999 | Mills et al. | 348/715 |
| 5,926,647 A | 7/1999 | Adams et al. | 395/800 |
| 5,940,089 A | 8/1999 | Dilliplane et al. | 345/515 |
| 5,948,082 A | 9/1999 | Ichikawa | 710/52 |
| 5,949,432 A | 9/1999 | Gough et al. | 345/435 |
| 5,949,439 A | 9/1999 | Ben-Yoseph et al. | 345/503 |
| 5,951,644 A | 9/1999 | Lambrecht et al. | 710/124 |
| 5,953,691 A | 9/1999 | Mills | 702/198 |
| 5,956,041 A | 9/1999 | Koyamada et al. | 345/420 |
| 5,959,626 A | 9/1999 | Garrison et al. | 345/341 |
| 5,959,637 A | 9/1999 | Mills et al. | 345/506 |
| 5,961,603 A | 10/1999 | Kunkel et al. | 702/229 |
| 5,963,201 A | 10/1999 | McGreggor et al. | 345/326 |
| 5,963,262 A | 10/1999 | Ke et al. | 348/447 |
| 5,966,385 A * | 10/1999 | Fujii et al. | 370/465 |
| 5,977,933 A | 11/1999 | Wicher et al. | 345/3 |
| 5,982,305 A | 11/1999 | Taylor | 341/61 |
| 5,982,425 A | 11/1999 | Allen et al. | 348/231 |
| 5,982,459 A | 11/1999 | Fandrianto et al. | 348/845 |
| 5,987,555 A | 11/1999 | Alzien et al. | 710/129 |
| 6,002,411 A | 12/1999 | Dye | 345/521 |
| 6,005,546 A | 12/1999 | Keene | 345/603 |
| 6,006,286 A | 12/1999 | Baker et al. | 710/22 |
| 6,006,303 A | 12/1999 | Barnaby et al. | 710/244 |
| 6,018,803 A | 1/2000 | Kardach | 713/323 |
| 6,023,302 A | 2/2000 | MacInnis et al. | 348/597 |
| 6,028,583 A | 2/2000 | Hamburg | 345/112 |
| 6,038,031 A | 3/2000 | Murphy | 358/1 |
| 6,046,740 A | 4/2000 | LaRoche et al. | 345/339 |
| 6,061,094 A | 5/2000 | Maietta | 348/446 |
| 6,061,402 A | 5/2000 | Boyce et al. | 375/240 |
| 6,064,676 A | 5/2000 | Slattery et al. | 370/412 |
| 6,067,322 A | 5/2000 | Wang | 375/240 |
| 6,072,771 A * | 6/2000 | Anderson et al. | 370/216 |
| 6,078,305 A | 6/2000 | Mizutani | 345/113 |
| 6,078,594 A * | 6/2000 | Anderson et al. | 370/498 |
| 6,088,355 A | 7/2000 | Mills et al. | 370/392 |
| 6,094,226 A | 7/2000 | Ke et al. | 348/446 |
| 6,098,046 A | 8/2000 | Cooper et al. | |
| 6,100,826 A | 8/2000 | Jeon et al. | 341/67 |
| 6,100,899 A | 8/2000 | Ameline et al. | 345/431 |
| 6,105,048 A | 8/2000 | He | 709/100 |
| 6,111,611 A * | 8/2000 | Ozkan et al. | 348/465 |
| 6,111,896 A | 8/2000 | Slattery et al. | 370/535 |
| 6,115,074 A * | 9/2000 | Ozkan et al. | 348/465 |
| 6,115,422 A * | 9/2000 | Anderson et al. | 375/240 |

| | | | |
|---|---|---|---|
| 6,121,978 A | 9/2000 | Miler | 345/435 |
| 6,133,901 A | 10/2000 | Law | 345/136 |
| 6,134,378 A | 10/2000 | Abe et al. | 386/52 |
| 6,144,392 A | 11/2000 | Rogers | 345/511 |
| 6,151,030 A | 11/2000 | DeLeeuw et al. | 345/435 |
| 6,151,074 A | 11/2000 | Werner | 348/425.1 |
| 6,151,078 A * | 11/2000 | Yoneda et al. | 348/558 |
| 6,157,415 A | 12/2000 | Glen | 348/599 |
| 6,157,978 A | 12/2000 | Ng et al. | 710/240 |
| 6,160,989 A | 12/2000 | Hendricks et al. | 455/4.2 |
| 6,169,843 B1 | 1/2001 | Lenihan et al. | 386/46 |
| 6,178,486 B1 | 1/2001 | Gill et al. | 711/151 |
| 6,184,908 B1 | 2/2001 | Chan et al. | 345/522 |
| 6,189,064 B1 | 2/2001 | MacInnis et al. | 710/244 |
| 6,189,073 B1 | 2/2001 | Pawlowski | 711/120 |
| 6,199,131 B1 | 3/2001 | Melo et al. | 710/107 |
| 6,204,859 B1 | 3/2001 | Jouppi et al. | 345/431 |
| 6,205,260 B1 | 3/2001 | Crinon et al. | 382/284 |
| 6,208,354 B1 | 3/2001 | Porter | 345/435 |
| 6,208,671 B1 | 3/2001 | Paulos et al. | 370/545 |
| 6,212,590 B1 | 4/2001 | Melo et al. | 710/119 |
| 6,215,703 B1 | 4/2001 | Bogin et al. | 365/185.33 |
| 6,226,794 B1 | 5/2001 | Anderson, Jr. et al. | 725/131 |
| 6,229,550 B1 | 5/2001 | Gloudemans et al. | 345/435 |
| 6,236,727 B1 | 5/2001 | Ciacelli et al. | 380/5 |
| 6,239,810 B1 | 5/2001 | Van Hook et al. | 345/431 |
| 6,240,553 B1 * | 5/2001 | Son et al. | 725/95 |
| 6,252,608 B1 | 6/2001 | Snyder et al. | 345/473 |
| 6,263,019 B1 | 7/2001 | Ryan | 375/240.02 |
| 6,263,023 B1 | 7/2001 | Ngai | 375/240.12 |
| 6,263,396 B1 | 7/2001 | Cottle et al. | 710/263 |
| 6,269,107 B1 | 7/2001 | Jong | 370/535 |
| 6,275,501 B1 | 8/2001 | Anderson et al. | 370/487 |
| 6,281,873 B1 | 8/2001 | Oakley | 345/127 |
| 6,286,103 B1 | 9/2001 | Maillard et al. | 713/200 |
| 6,311,204 B1 | 10/2001 | Mills | 709/100 |
| 6,320,619 B1 | 11/2001 | Jiang | 348/447 |
| 6,326,963 B1 | 12/2001 | Meehan | 345/419 |
| 6,326,984 B1 | 12/2001 | Chow et al. | 345/764 |
| 6,327,000 B1 | 12/2001 | Auld et al. | |
| 6,335,746 B1 | 1/2002 | Enokida et al. | 345/839 |
| 6,337,703 B1 | 1/2002 | Konar et al. | 345/858 |
| 6,339,434 B1 | 1/2002 | West et al. | 345/667 |
| 6,351,471 B1 | 2/2002 | Robinett et al. | 370/468 |
| 6,351,474 B1 | 2/2002 | Robinett et al. | 370/468 |
| 6,353,460 B1 | 3/2002 | Sokawa et al. | 348/555 |
| 6,353,930 B1 * | 3/2002 | Shimoji et al. | 725/110 |
| 6,362,827 B1 | 3/2002 | Ohba | 345/572 |
| 6,369,855 B1 * | 4/2002 | Chauvel et al. | 348/423.1 |
| 6,374,244 B1 | 4/2002 | Shibata | 707/9 |
| 6,380,945 B1 | 4/2002 | MacInnis et al. | 345/602 |
| 6,384,840 B1 | 5/2002 | Frank et al. | 345/634 |
| 6,408,436 B1 | 6/2002 | deHaas | 725/86 |
| 6,411,333 B1 | 6/2002 | Auld et al. | 348/441 |
| 6,421,460 B1 | 7/2002 | Hamburg | 382/162 |
| 6,426,755 B1 | 7/2002 | Deering | 345/581 |
| 6,434,319 B1 | 8/2002 | Wine | 386/46 |
| 6,459,456 B1 | 10/2002 | Oh | 348/564 |
| 6,466,624 B1 | 10/2002 | Fogg | 375/240.27 |
| 6,467,093 B1 | 10/2002 | Inove et al. | 725/151 |
| 6,496,186 B1 | 12/2002 | Deering | 345/419 |
| 6,496,862 B1 * | 12/2002 | Akatsu et al. | 709/224 |

OTHER PUBLICATIONS

Bao, Jay et al., "HDTV Down–Conversion Decoder," IEEE Transactions on Consumer Electronics, pp. 402–410, vol. 42, No. 3, Aug. 1996.

Mokry, Robert et al., "Minimal Error Drift in Frequency Scalability for Motion–Compensated DCT Coding," IEEE Transactions on Circuits and Systems for Video Technology, pp. 392–406, vol. 4, No. 4, Aug. 1994.

Vetro, Anthony et al., "Minimum Drift Architectures for 3–Layer Scalable DTV Decoding," IEEE Transactions on Consumer Electronics, pp. 527–536, vol. 44, No. 3, Aug. 1998.

Lee, Dong–Ho et al., "HDTV Video Decoder Which Can Be Implemented With Low Complexity," IEEE International Conference on Consumer Electronics, pp. 6–7, 1994.

Sun, Huifang, "Hierarchical Decoder For MPEG Compressed Video Data," IEEE Transactions on Consumer Electronics, pp. 559–564, vol. 39, No. 3, Aug. 1993.

Yu, Haoping et al., "Block–Based Image Processor for Memory Efficient MPEG Video Decoding," 1999 IEEE International Conference on Consumer Electronics, pp. 114–115, 1999.

Blinn, Jim; Jim Blinn's Corner Dirty Pixels; publication; 1998; pp. 179–190; Chapter Sixteen; Morgan Kaufmann Publishers, Inc.; San Francisco, CA, U.S.A.

Foley, James D. et al.; Computer Graphics: Principles and Practice; publication, 1996, 1990; The Systems Programming Series, 4 pages, Second Edition in C; Addison–Wesley Publishing Company; U.S.A.

Motorola, Inc., MC92100 "Scorpion" Graphics Display Generator, SDRAM Controller, and Digital Video Encoder, 1997, 6 pages.

Power TV, Inc., Eagle ™. Graphics/Audio Media Compositor Data Sheeet, Version 1.7, Feb. 27, 1997, 63 pages.

* cited by examiner

TRANSPORT PROCESSOR

CROSS REFERENCE TO RELATED APPLICATIONS

This application is a continuation-in-part of, and claims benefit of and priority from, U.S. patent application Ser. No. 09/969,212 Filed Oct. 2, 2001, titled "Single Chip Set-Top Box System", which claims benefit of and priority from Provisional Application No. 60/266,753 Filed Feb. 5, 2001, titled "Single Chip Set-Top Box System" the complete subject matter of each of which is incorporated herein by reference in its entirety.

This application is also a continuation-in-part of, and claims benefit of and priority from, U.S. patent application Ser. No. 09/640,869 Filed Aug. 18, 2000, titled "Video and Graphics System with A Data Transport Processor" now U.S. Pat. No. 6,538,656 issued Mar. 25, 2003, which is a continuation-in-part of, and claims benefit and priority from, U.S. patent application Ser. No. 09/437,208 Filed Nov. 9, 1999, titled "Graphics Display System" now U.S. Pat. No. 6,570,579 issued May 27, 2003, and claims the benefit of and priority from Provisional Application No. 60/30,866 Filed Dec. 14, 1999, titled "Graphics Chip Architecture" the complete subject matter of each of which is incorporated herein by reference in its entirety.

This application is continuation-in-part of, and claims benefit of and priority from, U.S. patent application Ser. No. 09/641,374 Filed Aug. 18, 2000, titled "Video, Audio and Graphics Decode, Composite and Display System", which is a continuation-in-part of, and claims benefit of and priority from, U.S. patent application Ser. No. 09/437,208 Filed Nov. 9, 1999, titled "Graphics Display System" now U.S. Pat. No. 6,570,579 issued May 27, 2003, and claims the benefit and priority from Provisional Application No. 60/30,866 Filed Dec. 14, 1999 titled "Graphics Chip Architecture" the complete subject matter of each of which is incorporated herein by reference in its entirety.

FEDERALLY SPONSORED RESEARCH OR DEVELOPMENT

[Not Applicable]

SEQUANCE LISTING

[Not Applicable]

MICROFICHE/COPYRIGHT REFERENCE

[Not Applicable]

BACKGROUND OF THE INVENTION

One embodiment of the present invention relates to a transport processor. More specifically, one embodiment of the present invention relates to a system and method for processing data packets or information using a transport processor.

Known receivers or decoders are adapted to accept inputs from one or more input sources at a time. It is contemplated that each input may contain multiple programs, each program identified by a program identifier. It is also contemplated that among all the input sources there may be programs with the same program identifier, which may create problems for processing such programs.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

One embodiment of the present invention relates to a system and method for processing information, specifically data packets. One embodiment of the present invention relates a method for processing information, comprising determining if a first identifier associated with the information is acceptable and assigning a second identifier to the information. The method further includes determining a type of processing required using the second identifier and performing that type of processing on the information.

Another embodiment of the present invention relates to a method for processing at least one data packet using a data processor. The method comprises receiving the at least one data packet from at least one input band and determining if a packet identifier associated with the data packet is acceptable. The method assigns a tag to the data packet and communicates the tag to at least one processing block. The method further comprises determining if processing of the data packet is required using the tag, determining what type of processing that is needed based on the tag, and performing that type of processing.

Another embodiment of the present invention relates to a transport processor used to process data packets. The transport processor comprises at least a parser device adapted to assign a unique tag to the data packets based on a packet identifier.

Other aspects, advantages and novel features of the present invention, as well as details of an illustrated embodiment thereof, will be more fully understood from the following description and drawing, wherein like numerals refer to like parts.

DETAILED DESCRIPTION OF THE INVENTION

One embodiment of the present invention relates to processing one or more inputs. More specifically, one embodiment of the present invention relates to processing input streams using a transport processor used, for example, to transport input streams from a communication channel to a video channel. It is contemplated that such input streams may comprise data, information, data packets, audio/video data, system data, private data, etc. In accordance with the present invention, the transport processor is adapted to accept input streams from one or more input sources or bands (i.e., in-band or out-of-band streams for example) at a time. Each band or input stream may include one or more multiple programs or transport streams, where each program or transport stream is identified by a first identifier or program ID (alternatively referred to as "PID").

Figure 1:
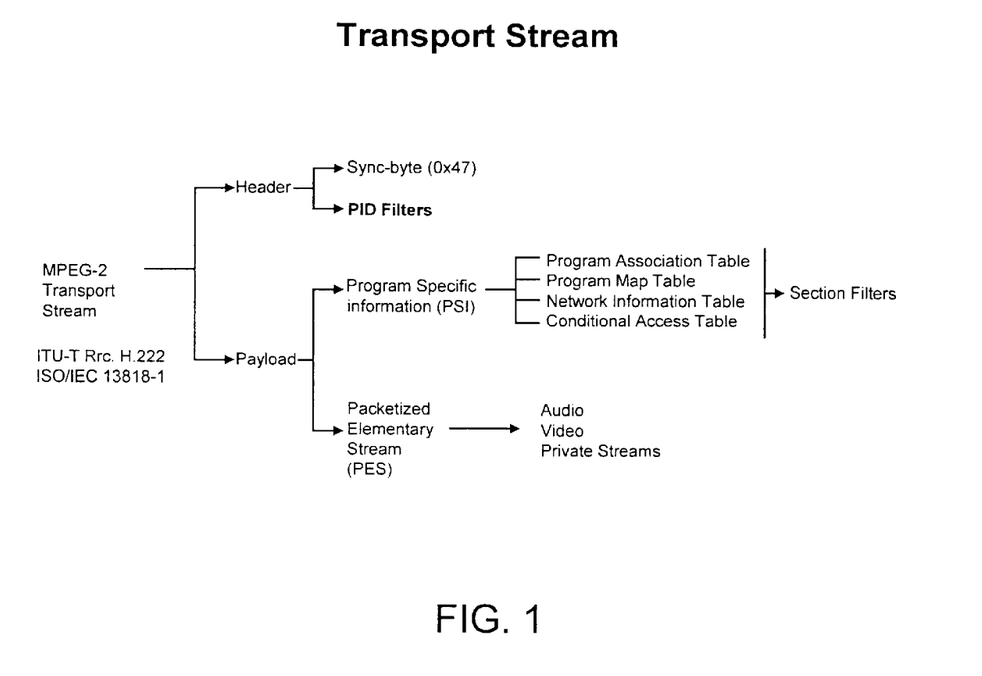
FIG. 1 illustrates one embodiment of a flow diagram depicting an exemplary transport stream through a transport processor in accordance with the present invention.

FIG. 1 illustrates an exemplary transport or input stream (MPEG-2 for example) processed through or using a transport processor. In one embodiment of the present invention, an MPEG-2 audio/video decoder (not shown) receives one or more MPEG-2 transport streams from a transceiver (not shown). The illustrated MPEG-2 transport streams may include one or more in-band streams (high data rate streams such as audio or video data) and/or out-of-band streams (such as low data rate messaging communicated to or from a termination point or headend). It is contemplated that such in-band streams may include, without limitation, such universal multi-standards as Annex A, Annex B or Annex C, while such out-of-band streams may include, without limitation, DAVIC, MPEG layered on DAVIC or straight MPEG.

In the illustrated embodiment, each input stream or band may comprise at least header and payload information. In the illustrated embodiment, the header information may include sync-byte and PID information.

In one embodiment, the payload information may comprise program specific information (alternatively referred to as "PSI") and Packetized Elementary Stream (alternatively referred to as "PES") information, or some combination thereof. The PSI may comprise information such as program associated table, program map table, network information table, and conditional access table, one or all of which may be processed by one or more section filters. PES may comprise audio, video and/or private streams.

Figure 2:
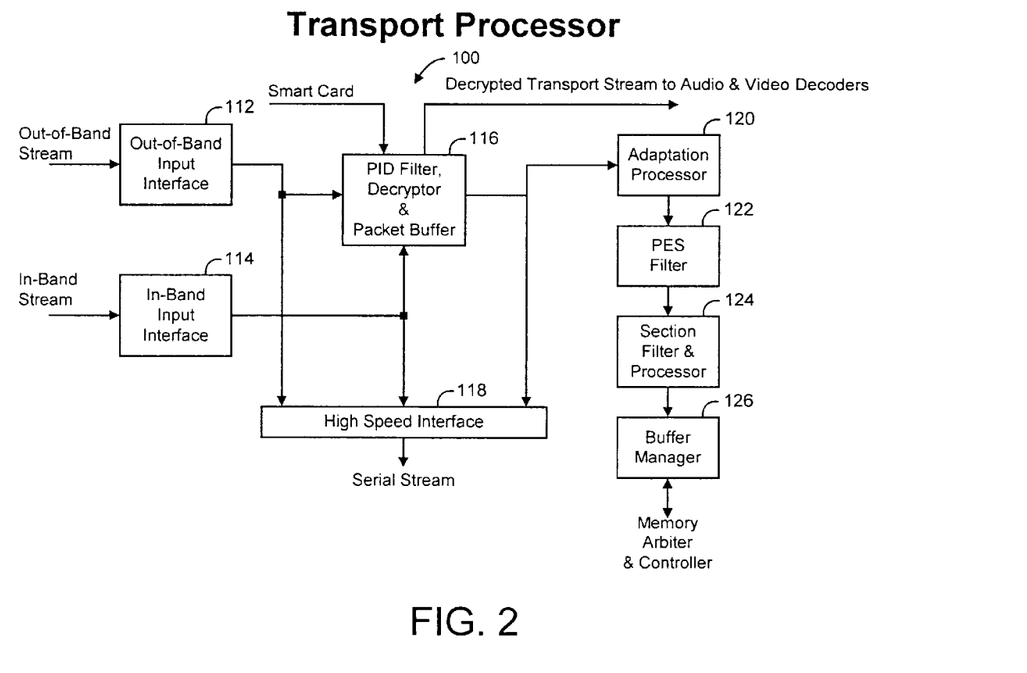
FIG. 2 illustrates a block diagram of one embodiment of a transport processor in accordance with the present invention.

The transport processor in accordance with one embodiment of the present invention may perform one or more of, but is not limited to, PID filtering, encrypting, decrypting and packet buffering of the received transport or input streams. It should be appreciated that the transport processor may be incorporated into a transceiver or as a separate block. FIG. 2 illustrates a block diagram of one embodiment of a transport processor 100 according to the present invention. The transport processor 100 may also perform one or more of, but is not limited to, adaptation processing, buffering, PES filtering and section filtering, as well as encryption and decryption. In one embodiment, the transport processor transmits private data to a memory controller.

In this embodiment, the transport processor 100 may comprise out-of-band and in-band input interfaces 112 and 114 respectively. The out-of-band input interface 112 is adapted to receive one or more out-of-band streams (comprising high speed information such as program information for example), while the in-band input interface 114 is adapted to receive one or more in-band input streams (comprising lower speed information such as system information for example).

It is contemplated that the out-of-band input interface 112 may communicate information to either a PID Filter, Decryptor and Packet Buffer 116 which filters or parses the PIDs and/or a high speed interface 118, which may output a serial stream. It is further contemplated that the in-band input interface 114 may communicate information to the PID Filter, Decryptor and Packet Buffer 116 and/or the high speed interface 118. In this embodiment, the PID Filter, Decryptor and Packet Buffer 116 may receive information from a smart card and output a decrypted transport stream to audio & video decoders.

FIG. 2 also illustrates an adaptation processor 120, a PES filter 122, a section filter and processor 124, and a buffer manager 126. The PID Filter, Decryptor and Packet Buffer or parser 116 outputs information to such processors, filters and managers as illustrated.

The transport processor 100 includes a complex state machine that accepts serial data up to about 60 Mbps from the in-band receiver and up to about 3 Mbps from the out-of-band receiver simultaneously. The transport parser and demultiplexer extracts and decrypts the MPEG-2 video data for example, Dolby Digital audio data for example, and PCR from the input in-band transport stream. It extracts PSI and generic PES data from the input in-band or out-of-band data stream. In one embodiment, the demultiplexer includes a generic data filter, a high speed data filter, a video data filter, and an audio data filter. The data transport demultiplexer is capable of demultiplexing 44 data PIDs from the in-band or out-of-band data stream, for example, and supports 32 section filters.

Stream requirements dictate parallel comparisons for the filters that result in a register programmable hardwired implementation under state-machine control. The backend of the transport demultiplexer interfaces to the memory arbiter that, in one embodiment, controls the system memory at about 81 MHz over a 32-bit bus for example. The transport module supports a DVB and DES descrambler. The DVB engine supports full and conformance modes. The DES engine supports electronic code book and cipher block chaining modes with selectable residue termination modes of partial block unscrambled, residual block termination, and cipher-text stealing. This cryptosystem together with two on-chip smart card interfaces are used for conditional access control.

In one embodiment, the transport processor 100 transmits decrypted transport stream to the audio decoder and the video processor for audio and video decoding, respectively. The audio decoder and the video processor may included in an audio/video decoder.

The in-band front end of one embodiment of the transport processor interfaces to access control pins. The input data rate to the in-band transport demux is, in one example, 60 Mbps maximum. The transport demux may also interface directly to the out-of-band receiver or the on-chip DAVIC MAC via an internal 3-wire interface. The out-of-band input data rate is about 3 Mbps maximum. Video data may be stored in a dedicated video 2 Mbyte SDRAM. Audio, PSI and generic PES data may be stored in a system memory. Therefore, the back-end of the transport demultiplex interfaces to the memory arbiter that controls the system memory. The system memory interface is an 81 MHz 32-bit bus for example.

In one embodiment, the transport processor is an MPEG-2 transport stream message/PES parser and demultiplexer capable of processing two independent serial transport streams simultaneously. The processor supports decryption for up to 44 PIDs in the in-band stream for example. The processor supports 32 PIDs for PSI message or PES processing, and it supports 32 PSI section filters or filters for processing of MPEG or DVB sections. In one embodiment, it includes a special addressing mode that filters MPEG and private stream messages. The messages are preferably stored in one of 32 circular message buffers that reside in external memory.

The transport processor module may support two simultaneous input channels, typically allocated to the in-band and out-of bandstreams, respectively. There are two input synchronizers that synchronize incoming serial transport packets to the module's processing clock. The data may then converted to bytewide format.

The transport processor module may support a DVB and DES descrambler for up to 44 PIDs in the in-band transport stream including video, audio and data streams. The DVB engine supports full and conformance mode. The DES engine supports ECB and CBC mode with selectable residue termination modes of partial block unscrambled, residual block termination and cipher-text stealing. There is a mode for the processor to use the DES engine to encrypt or decrypt 64 bits of data during transport stream decryption. The microprocessor is preferably guaranteed a result in ninety-four 81 MHz clock cycles.

The illustrated embodiment includes two independent PID filters. In this embodiment, a PID table (a 44 entry PID table for example) is used to compare with PIDs of the transport streams. Each PID filter examines its corresponding transport stream for at least the PIDs that it is programmed to accept. In one embodiment, each filter examines at least one PID and Band. Each of the 44 PIDs for example may be arbitrarily allocated between the two input channels. The output of the PID filters form 44 PID channels of transport packet data for example, each corresponding to a PID table entry. Data from up to 32 PID channels (0–31), after further processing, are sent to one of 32 DRAM buffers. For out-of-band transport stream only, the same PID may be selected for different PID channels, allowing different PSI section filter output of the same PID stream to be sent to different memory buffers. Common PIDs between the two streams are processed as two independent PIDs. The PID filter examines the continuity counter and rejects duplicate packets. It generates error interrupts for length errors and discontinuity errors.

The same PID may be assigned to more than one PID channel or input stream (referred to as duplicate PID assignments). This feature may be used to provide different PSI or PES filtering options for messages within a common PID stream. There may be constraints to follow when utilizing duplicate PID assignments. For any single PLD channel, only 1 type of packet filtering option is allowed. For out-of-band transport streams, the same PID may be selected for different PID channels, enabling different PSI section filter output of the same PID stream to be sent to different memory buffers. For duplicate PIDs, if one channel is programmed for all-pass, then the rest of the channels with the same PID will also be treated as if they were programmed for all-pass. This is true even if the other duplicate PID channels are not programmed for PES, PSI or all-pass. For MPEG, since either PES packets or PSI messages (but not both) are contained in a single PID, it is preferred that there not be duplicate PIDs with a mixture of both PES and PSI filtering enabled. When duplicate PID assignments are created which cause a single message to be stored to more than one memory buffer, the total data throughput of the transport processor is reduced.

The transport processor module includes a packet input buffer that holds all accepted transport packets and presents them in turn to subsequent processing blocks. In one embodiment, the buffer is incorporated into the parser. The maximum processing rate of the selected transport packets is about 81 Mbps. Packets not selected by the PID filters are not stored.

Figure 3:
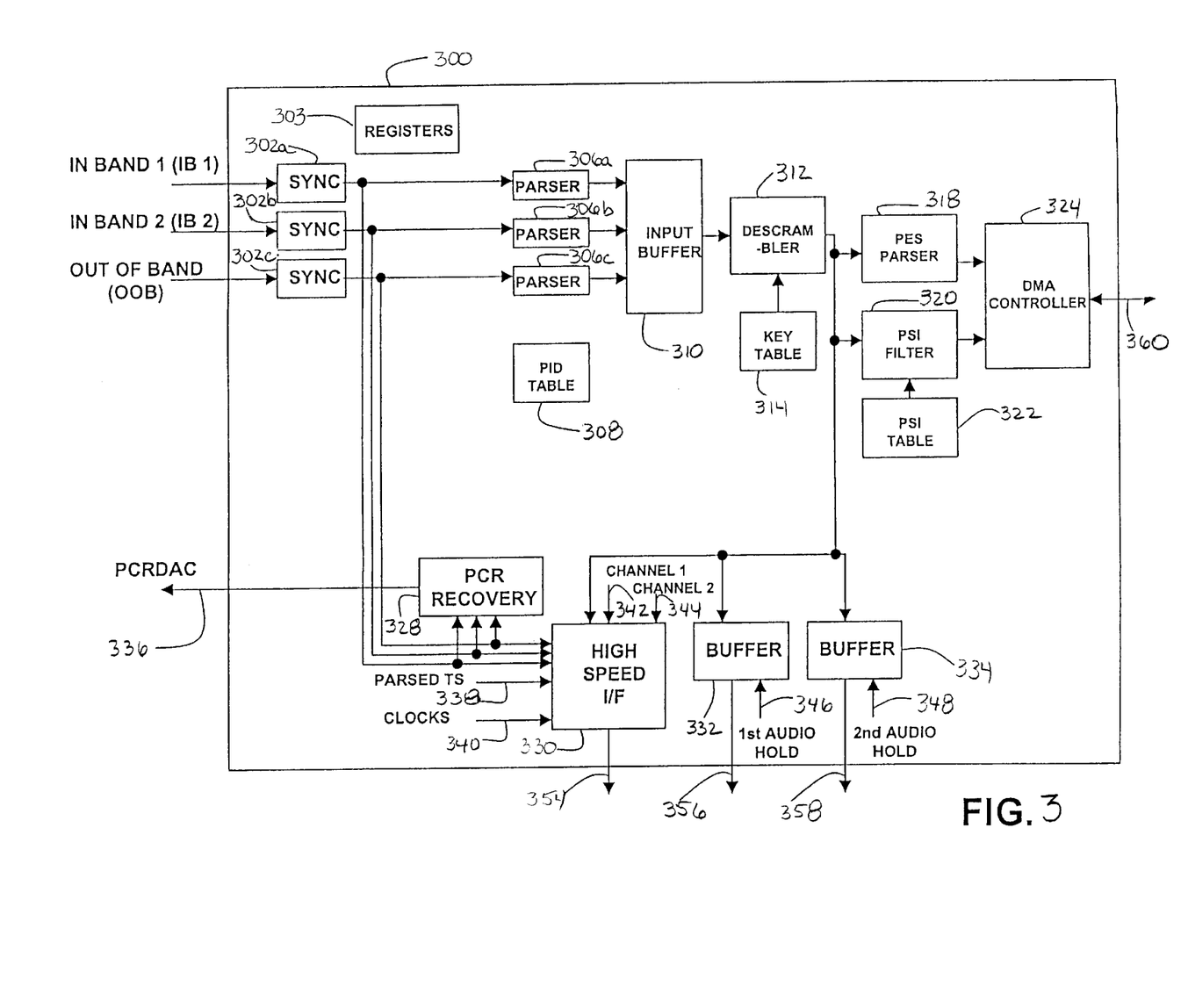
FIG. 3 illustrates a block diagram of another embodiment of a transport processor in accordance with the present invention.

FIG. 3 illustrates a block diagram of another embodiment of a transport processor 300 of the present invention. The transport processor 300 preferably performs descrambling of the transport streams (MPEG transport streams for example). The descrambling may include DES and DVB descrambling as well as descrambling of transport streams encrypted using other encryption methods. The transport processor 300 preferably provides the descrambled transport streams to a video transport and an audio decode processor (alternatively referred to as "ADP"). The transport processor 300 preferably also extracts message data from the input streams and transfers them to an external memory, SDRAM for example. The external memory may be configured as 32, 64 or other suitable number of circular memory buffers.

A transport stream (MPPEG for example) typically includes fixed-length transport packets. Each transport packet is typically 188 bytes long. The transport processor 300 is, in one embodiment, an MPEG-2 transport stream message/PES parser and demultiplexer. The transport processor 300 preferably is capable of simultaneously receiving and processing three independent serial transport streams, two-inband (alternatively referred to as "IB") streams and one out-of-band (alternatively referred to as "OOB") stream for example. The transport processor 300 preferably has transport packet processing throughput of 81 Mbps. In other embodiments, the data transport may be capable of receiving more or less than three independent serial transport streams, and the transport packet processing throughput may be more or less than 81 Mbps.

The transport processor 300 preferably performs filtering of multiple PIDs for message or PES processing (32 for example). In other embodiments, transport processor 300 may filter more or less than 32 PID's, up to 64 PID's for example. In addition, the transport processor 300 preferably includes 32 PSI section filters for processing of MPEG or DVB sections. In other embodiments, the data transport may filter more or less than 32 sections, up to 64 sections for example. The sections may include program specific information or PSI and/or private sections.

The transport processor 300 typically receives the transport streams at different data rates. For example, the out-of-band transport stream is typically received synchronized to a 3.5 MHz clock. The in-band transport streams are typically received synchronized to a clock having a frequency range of, about 1 to about 60 MHz for example. Since the transport processor 300 in the described embodiment operates at a fixed frequency, 40.5 MHz or 81 MHz for example, the three transport streams are received by three input synchronizers 302a–c.

The three input synchronizers 302a–c preferably synchronize incoming transport packets (MPEG-2 for example) to the data transport clock. In other embodiments, the transport processor 300 may operate at different clock frequencies. Each input synchronizer preferably includes a serial-to-parallel converter for converting incoming data into parallel, e.g., byte-wise, format.

From the input synchronizers 302a–c, the transport streams preferably are provided to parsers 306a–c, which may also be called PID filters. The parsers 306a–c preferably compare the PID's of the incoming transport streams with the PID's in the PID table 308 to extract only the data associated with the PID's found in the PID) table 308. The parsers 306a–c preferably also perform error checking, such as continuity error checking, to ensure that the received transport packets do not contain error. In one embodiment, the parsers 306a–c assign a unique tag or id to the transport stream, In one embodiment, the PID table 308 preferably includes 32 PID's. In other embodiments, the PID table 308 may include more or less than 32 PID's, 64 PID's for example. Some of the PID's may be filtered by hardware for increased throughput, while some other PID's may be filtered by programmable firmware for increased flexibility. Entries in the PID table may be arbitrarily assigned to any of the three transport streams. Each of the three transport streams preferably are processed uniquely, even in cases when two or more of the transport streams contain the same PID.

The synchronizers 302a–c preferably also provide the synchronized transport streams to a high speed interface module 330. The high speed interface module 330 preferably also receives parsed transport streams 338 of all three of the transport streams: IB 1, IB 2 and OOB. The parsed transport streams 338 preferably are provided by the parsers 306a–c. In addition, the high-speed interface module 330 preferably receives clocks 340 for all three of the synchronized transport streams.

It is also contemplated that the high speed interface module 330 preferably also receives a channel 1 stream 342 and a channel 2 stream 344. The channel 1 stream 342 and channel 2 stream 344 are provided by output buffers 332 and 334 as outputs 356 and 358, respectively. Further, the high speed interface module 330 preferably receives the decrypted parsed transport streams, which have been decrypted by a descrambler 312 and provided as an output.

With all these inputs, the high speed interface module 330 preferably provides an output 354. The output 354 may include one or more of the synchronized transport streams, the parsed transport streams 338, the decrypted parsed transport streams, the clocks 340 and the channel 1 and channel 2 streams 342 and 344. The output 354 of the high speed interface 330 preferably is provided to a port as an output of the system, e.g., integrated chip, of the present invention.

Register variables within the transport processor 300 preferably are stored in registers 303. The registers 303 preferably are on a register bus of the system.

The parsers 306a–c preferably also provide the parsed transport streams to an input buffer 310. The input buffer 310 preferably is capable of storing up to eight 188-byte transport packets (MPEG-2 for example). In other embodiments, the number of transport packets stored in the input buffer 310 may be more or less than eight for example. The input buffer 310 preferably outputs to a descrambler 312.

The descrambler 312 preferably performs DES and DVB descrambling. The descrambler 312 may also be used to decrypt transport streams encrypted using other encrypting methods. The descrambler 312 preferably receives key data for decrypting from a key table 314. Each of the encrypted input transport streams preferably is decrypted using DES, DVB or other descrambling methods. The type of descrambling performed on each transport stream preferably is selectable. For decryption, even and odd keys preferably are provided. The keys typically are 64 bits in size, however, they may be 56 or other number of bits in size in some embodiments.

The output of the descrambler 312 preferably is also provided to the buffers 332 and 334. In addition to receiving the output of the descrambler 312, the buffers 332 and 334 preferably are provided with a first audio hold signal 346 and a second audio hold signal 348, respectively. All three transport streams, IB 1, IB 2 and OOB transport streams, preferably are included in a decrypted parsed transport stream output of the descrambler 312. In other embodiments, one or two, but not all three of the transport streams may be included in the output of the descrambler 312.

The buffers 332 and 334 preferably provide channel 1 and channel 2 outputs 356 and 358, respectively. The channel 1 and channel 2 outputs may be provided to the video transport or to the audio decode processor or ADP. When decrypted parsed transport streams from the buffers 332 and 334 are received by the video transport and the ADP, the video transport and the ADP determine whether the incoming data is video or audio and process them accordingly.

In one embodiment, the video transport is capable of processing video data from both the output buffers 332 and 334. The data transport and the video transport are capable of processing the incoming transport streams (MPEG-2 for example) to display multiple video simultaneously in, e.g., picture-in-picture (alternatively referred to as "PIP") or tile format. The ADP preferably extracts audio data from one or the other of the output channels 1 and 2, 356 and 358 respectively. In other embodiments, the ADP may extract audio data from both the channels 1 and 2.

The first audio hold and second audio hold signals preferably are provided by the audio decode processor. The first audio hold signal indicates to the buffer 332 that an audio buffer (e.g., in the ADP) receiving the channel 1 output 356 requests that the output 356 be held until the audio buffer is ready to receive the output 356 again. Similarly, the second audio hold signal indicates to the output buffer 334 that the audio buffer (e.g., in the ADP) requests that the channel 2 output 358 be held. Thus, the first and second audio hold signals preferably safeguard against overflow of the audio buffer.

The input synchronizers 302a–c preferably also provide synchronized transport streams to a PCR recovery module 328 for extraction of program clock information (alternatively referred to as "PCRs"). The PCR recovery module 328 preferably extracts the PCRs from the transport streams and outputs as a program clock reference (alternatively referred to as "PCR") output 336. Maintaining upstream timing synchronicity is typically important when playing transmitted programs directly, and the availability of a local reference clock generally enables playback synchronicity between video and audio. Thus, the PCR output 336 preferably is provided simultaneously to downstream devices including but not limited to the video transport, the ADP and other synchronous devices. Using the PCR output 336, the downstream devices may operate in a time synchronous manner with one another, the transport processor 300 and upstream devices that use the program clock, e.g., an upstream transmitter.

The PCR recovery module 328 may extract PCRs from transport streams having different formats including but not limited to MPEG Transport streams and DIRECT transport streams. The PCR output 336 preferably is a serial output signal as to conserve chip area. In other embodiments, the PCR output 336 may be a parallel output signal.

The program clock information or PCRs extracted from the transport stream preferably is loaded into a counter and may be used to lock the system clock of the transport processor 300 to the program clock. In this manner, a timing relationship may be maintained between the transport processor 300 and the upstream transmitter. The PCRs may typically be extracted from the input streams at any time, and sent to the downstream devices either as they are available or only at discontinuities. The discontinuities may exist in the recovered PCRs, for example, when the transport streams include elementary streams generated using different program reference clocks.

In one embodiment decision circuitry preferably is used to send some or all of the PCRs to the downstream devices such as the video transport or the ADP. The ADP typically only requires a PCR when there is a channel change or a PCR discontinuity. The ADP preferably has its own local PCR counter, which typically is re-loaded under these conditions. Thus, for example, only the PCRs loaded into a local PCR counter, which may also be referred to as a system time clock (alternatively referred to as "STC") counter, are typically provided to the ADP. The PCRs may also be sent to the downstream devices at other intervals.

The PCR output 336 preferably is also provided to an external DAC (alternatively referred to as "PCRDAC') for digital-to-analog conversion. The digital-to-analog-converted program clock reference output is provided to a voltage control oscillator (alternatively referred to as "VCXO") to adjust the voltage level to control the VCXO frequency, which in turn adjusts the system clock to lock to the program clock. The data transport may include the PCRDAC in other embodiments. In still other embodiments, the PCRDAC may be included in one of the downstream devices such as the video transport.

In other embodiments, the PCR output 336 may be programmed by a host CPU, so as to create a reference clock locally, instead of, or in addition to, extracting PCRs from the input streams. In this embodiment, the host CPU preferably performs a "direct load" function, in which the host CPU programs serial PCRs that are sent rather than have the PCRs extracted from the input streams. Thus, the mode to transmit the extracted PCRs may be overridden by a mode to transmit user defined PCRs, i.e., programmed PCR output.

The descrambler 312 preferably also provides the decrypted parsed transport streams to a PES parser 318. In one embodiment, the PES parser 318 preferably parses the decrypted parsed transport streams and provides the PES header and data to the DMA controller 324 for storage in the external memory, e.g., the circular memory buffers implemented in SDRAM. In another embodiment, the output of the PES parser 318 is not stored in the external memory. Instead, the output of the PES parser 318 provides audio and video streams to the video transport and the ADP, respectively. In the described embodiment, the data streams are provided to the in-band 1 channel or the in-band 2 channel, respectively, of the video transport.

The PES parser may perform PES packet extraction for any of the PID channels. In other embodiments, there may be more, 64 for example, or less PID channels. There are 32 (or 64) PID's for all three input transport streams, spanning across all three channels. The packetized elementary stream or PES parser 318 preferably looks at the PES header to determine the length of the PES stream, and thereby figure out the end of the PES stream.

The descrambler 312 preferably also provides the decrypted parsed transport streams to a PSI filter 320. The PSI filter preferably is a thirteen-byte filter with an associated mask. The PSI filter 320, in the first part of the section, selectively filters messages out of the data stream of the current PID and provides to the DMA controller 324 to be written to the external memory, e.g., the circular memory buffers. Thus, the PSI filtering extract messages from the transport streams. The PSI filter 320 preferably uses PSI filter data from a PSI table 322 for filtering.

The PSI filter 320 preferably is comprised of 32 section byte-compare filters for example. Each of the 32 section byte-compare filters preferably has a capability to filter 13 bytes as well as a mask per bit feature. In the transport processor 300, each PID channel may independently select any number of section byte-compare filters, where each filter may be used by multiple PID channels. The data extracted by the PSI filter 320 from the out-of-band and in-band transport streams preferably stored in one of circular memory buffers. For example, in one embodiment, there may be 64 circular memory buffers. The output of the PSI filter 320 preferably is provided to the external memory through the DMA controller 324 over a 64-bit bus. In other embodiments, the bus width may be different from 64, e.g., the bus may be a 128-bit bus.

The circular memory buffers may be distributed between message data from the PSI filter 320 and video/audio data from the PES parser 318. For example, 64 circular memory buffers in one embodiment may be configured into all PES data memory buffers. In another example, 64 circular memory buffers may be apportioned between the PES data and the PSI data- 62 data buffers and 2 PSI data buffers or any other distribution between the PES data buffers and the PSI data buffers. In addition, the transport processor 300 preferably performs a cyclic redundancy check (alternatively referred to as "CRC") to verify correctness of the data. The CRC is associated with the PSI filter 320.

It is contemplated that each of the circular memory buffers may be 1 K, 2 K, 4 K, 8 K, 16 K, 32 K, 64 K or 128 K bytes in size. In other embodiments, the size of the circular memory buffers may have other suitable size. Each of the circular memory buffers preferably is associated with a PID channel. For out-of-band packets, PID channels with duplicate PID's are allowed to output to different circular memory buffers.

The transport processor 300 may also include a special addressing mode for filtering of proprietary messages including but not limited to: message type range, single cast-unit address, network 40 address, multicast 40 address, multicast 24 address, multicast 16 address and independent wild cards for the network 40 and multicast 40 address.

Figure 4:
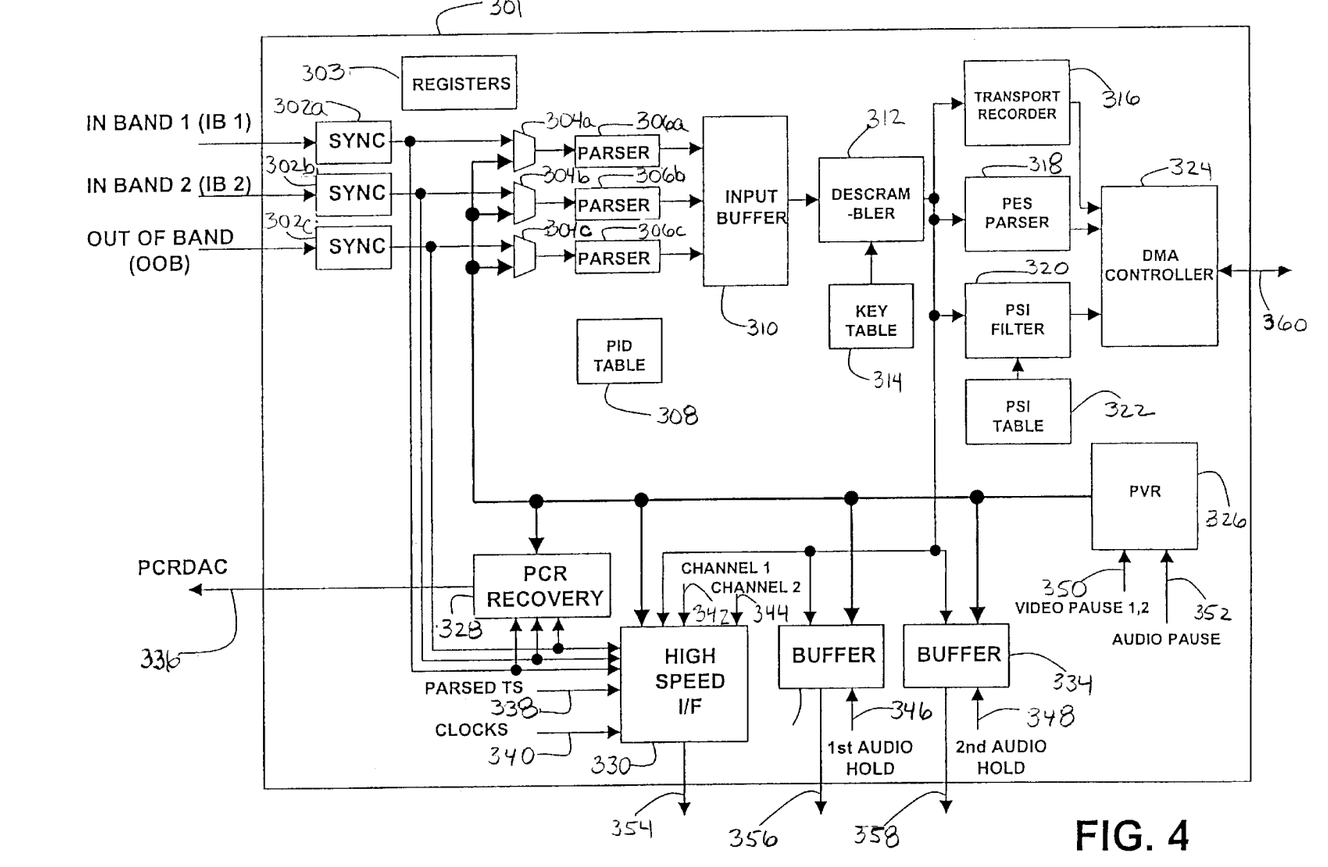
FIG. 4 illustrates a block diagram of yet another embodiment of a transport processor in accordance with the present invention.

FIG. 4 illustrates a block diagram of an alternate embodiment of the data transport according to the present invention. The transport processor 301 is similar to the transport processor 300 provided previously, except that the transport processor 301 may store complete transport packets in the external memory and playback the stored transport packets when desired.

In addition to the elements of the transport processor 300, the transport processor 301 of FIG. 4 includes multiplexers 304a–c, a transport recorder 316 and a playback circuit (alternatively referred to as "PVR") 326. During normal operation, the multiplexers 304a–c select the transport streams from the input synchronizers 302a–c, and thus the transport processor 301 operates similarly to the transport processor 300 of FIG. 3.

The transport recorder 316 may store complete transport packets in the circular memory buffers through the DMA controller 360. Data associated with one PID is typically stored in a circular memory buffer. When the record channels are used, one or more of the circular memory buffers preferably are configured for taking transport stream inputs. Thus, data associated with the PID's in the transport stream may be placed into a single circular memory buffer. In one embodiment, a single circular memory buffer may contain data associated with up to 64 PID's. In other embodiments, a single circular memory buffer may contain data associated with more or less than 64 PID's.

The playback circuit or PVR 326 may operate in either MPEG mode or DIRECTV mode for example. The PVR preferably performs DMA function of transferring data from the external memory, e.g., the circular memory buffers in SDRAM, into the transport processor 301. During the playback mode, the PVR 326 receives the stored transport packets from the external memory and provides to the buffers 1 and 2 332 and 334, the high speed interface module 330, the PCR recovery module 328 and the multiplexers 304*a–c*. During this mode, the multiplexers 304*a–c* provide the stored transport packets to the parsers 306*a–c*. Both the transport recorder 316 and the PVR 326 preferably have two channels: channel 1 and channel 2. Either channel may be used to store and playback the transport packets.

Unlike in the normal operation, where PCRs preferably are extracted from the input transport streams, during playback, the PCRs preferably are derived from program time stamps (alternatively referred to as "PTS") of the playback stream. This is due to the fact that the packets with PCR information may not have been recorded by the transport recorder 316. Further, even if such packets with PCR information have been recorded, the playback stream is not necessarily played back at a regular rate so that the PCRs may not arrive at proper intervals to be used in a manner that they are designed to be used. For the playback operation, since the PCRs are still needed decoding video and audio, a virtual PCR may be constructed by looking at the PTS information from the input streams. This user defined PCR may then be delivered to the video decoder by utilizing the serial PCR "direct load" capability, which has been discussed earlier.

Unlike directly transmitted data, in transport steams for example, which is synchronous because of the PCRs, the playback data is available from memory, potentially at a much higher rate than that required for the actual bit stream. This may cause an overflow of the video buffers. In one embodiment, during playback, two methods are available to prevent this overflow. These two methods preferably allow the video decoder to receive data only as they are needed.

The first method uses a throttling mechanism, allowing the playback stream to be sent at a data rate not faster than the maximum data rate, which may be programmed by the host CPU. This provides for a controlled bit rate and byte interval commensurate with the processing capabilities of the video decoder, which typically have a limit to input data rate. Thus, the PVR 326 in this embodiment preferably includes throttle control for controlling the maximum rate at which the recorded transport streams are played back. In this embodiment, the rate of playback may vary between about 10 to about 81 Mbps with a normal rate of playback of about 27 Mbps for example. Other embodiments may have different playback rates.

The second method uses a hold mechanism, which halts the data output. The hold mechanism preferably is activated when the video decoder faces imminent overflow conditions. The PVR 326 preferably receives video pause signals 1, 2 350 as well as an audio pause signal 352. The video pause signals 1, 2 preferably indicate to the PVR 326 that a video buffer for video for channel 1 or channel 2, respectively, is getting too full and not ready to receive further input and that the PVR 326 should pause before providing additional video data. The video buffer may alternatively referred to as a coded data buffer or a compressed data buffer. The video buffer sometimes is alternatively referred to as a video buffer verifier, VBV buffer or simply a VBV. In one embodiment, there actually are two video buffers for video for PIP display for example. Thus, video pause signals 1 and 2 preferably are provided by the video decoder to pause the two video buffers independently of each other. Similarly, the audio pause signal 352 preferably is provided by the ADP to the PVR 326 to indicate that an audio buffer is getting full and is not ready to receive further input and that the PVR 326 should pause before providing additional audio data.

In other embodiments, only one of the two methods, namely the throttle control mechanism and the hold mechanism, may be implemented to prevent overflow. In still other embodiments, other methods may be used to prevent overflow in the video and audio buffers.

During the playback mode, the PVR 326 may playback the packetized elementary streams or PES extracted by the PES parser 318 and stored in the external memory, i.e., circular memory buffer, rather than the transport packets. In this case, the PES may not be parsed in the parsers 306*a–c*. The PES stream preferably is provided to the high speed interface module 330 to be outputted as the output 354 and to the buffers 1 and 2 332 and 334 to be outputted as the outputs 356 and 358, respectively.

Figure 5A:
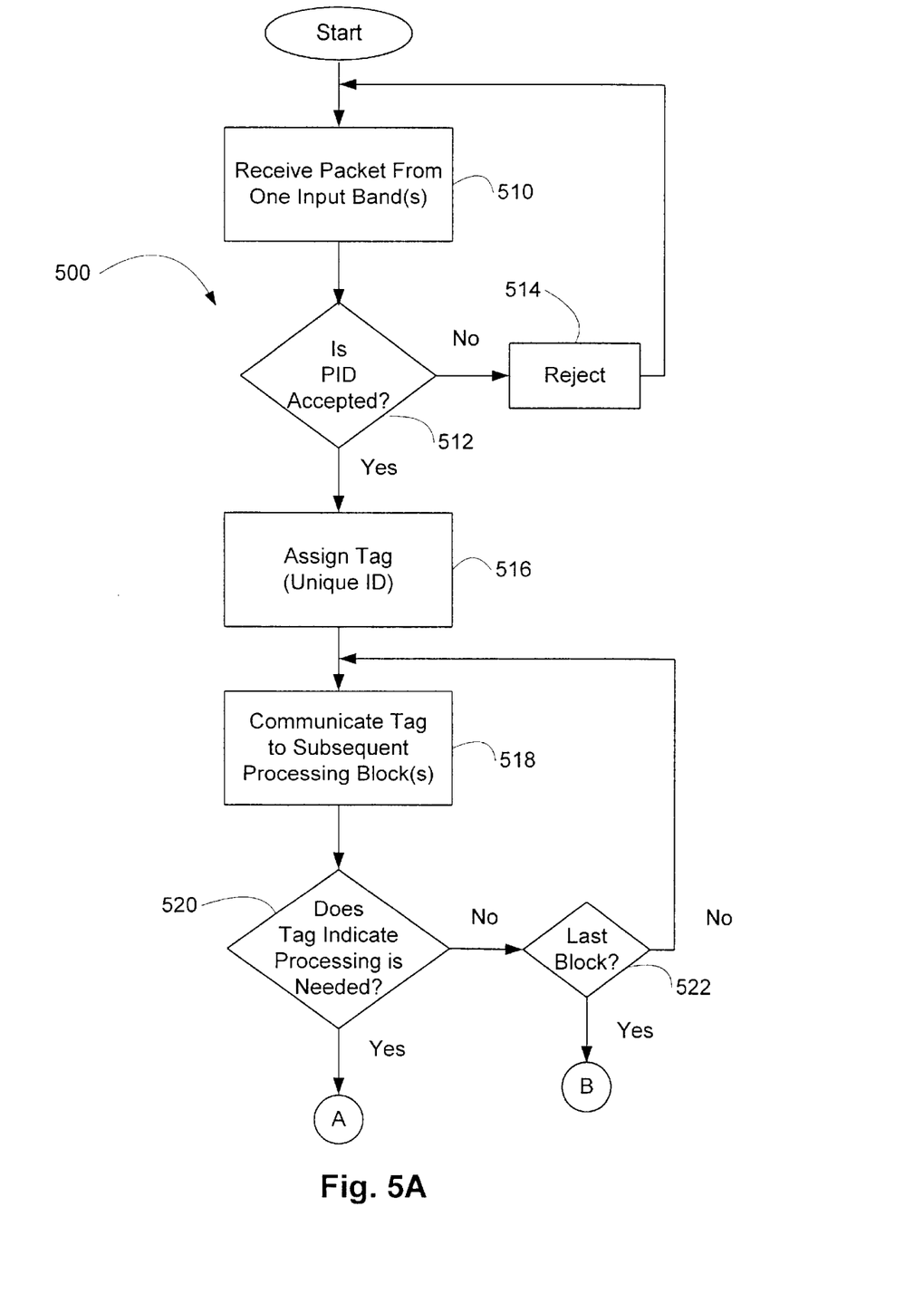
FIGS. 5A & 5B illustrate a flow chart of one embodiment of processing data or information in accordance with the present invention.
Figure 5B:
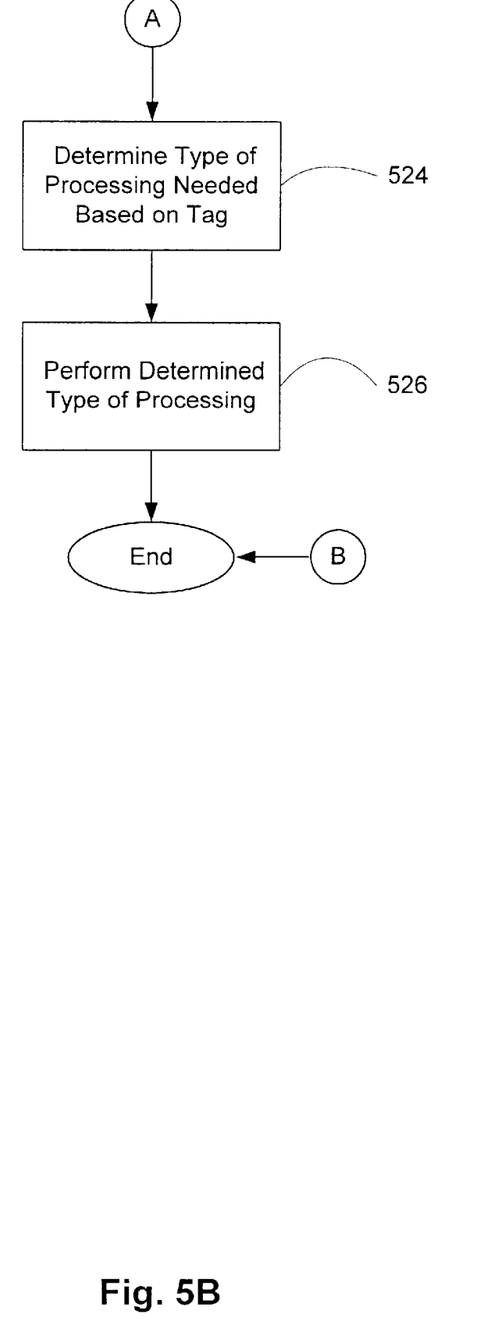

FIGS. 5A & 5B illustrate one method for processing input or information streams and generally designated 500. More specifically, FIGS. 5A & 5B illustrate one embodiment for processing one or more data packets using a transport processor similar to those provided previously. In accordance with one embodiment of the present invention, the transport processor is adapted to accept input from more than one input source or band at a time as illustrated by block 510. It is contemplated that there are multiple programs or streams within each band or input, where each program or stream is identified by PID. In one embodiment, the PID parser of the transport processor compares at least each input packet's PID with a stored table of PIDs to be accepted as illustrated by diamond 512. More specifically, PID parser compares the input packet's PID with a stored table of PIDs and bands. If the input packet's PID doesn't match one of such stored table of bands and PIDs, the input packet is rejected as illustrated by block 514, and a next packet (if available) is received. It the PID matches, the input packet is passed to one or more other processing modules or blocks as illustrated by block 518. Examples of such processing includes one or more of, but is not limited to, PID filtering, encrypting, decrypting and packet buffering In one embodiment, the parser assigns a second identifier, a unique tag or id as illustrated by block 516. These accepted packets are identified internally by such a unique tag, which contains information about the packet so other processing modules will know how, and with what parameters, to process each one. It is contemplated that among all the input bands, there may be packets with the same PID. The unique tags provide for the unique identification of each packet. The PID within the packets will no longer be necessary, or adequate, as identification. It is further contemplated that the PID table of accepted packets may have duplicate entries. These entries are identified by the channel numbers, the numeric value of each virtual channel. The unique tag provides a vector of matches that will accompany each accepted packet.

The subject method further determines if the data packets require processing. More specifically, the transport processor uses the tag to determine if processing is needed as illustrated by diamond 520. In one embodiment, the data packets are passed to the processing blocks in a sequential manner for example. If no processing is needed, the processor determines if this is the last processing block as illustrated by diamond 522. If this is the last block, the method may end such processing on that data packet, passing the data packet to a final destination (video, audio or memory buffers for example). In one embodiment, if this is the last data packet, the processing may terminate. If this, however, is not the last block, the method may communicate the tag to a subsequent processing block as illustrated by block 518.

If processing is needed, the method determines what type of processing is needed as illustrated by block 524. The transport processor then performs the determined type of processing as illustrated by block 526. In one embodiment, the method processes the data packets in a repetitive manner. However, it is also contemplated that the method determines if there is any other information or data packets to be processed and terminates the method if there is no other information to be processed.

One example of processing includes decrypting a data packet using one or more decryptors. In one embodiment, such decryptor is a multi-standard decryption module, supporting the DVB standard, and NIST DES standard for example with many termination modes. The module is preprogrammed to process each PID channel a specific way. When a data packet arrives for processing, the tag is examined to determine what PID channel the packet belongs. The data packet is decrypted with the preprogrammed format. No control processor intervention is necessary.

It is contemplated that some of these packets may contain messages, in MPEG PSI format for example. There may be many messages within each PID channel, and it is contemplated that many messages may sent to different buffer queues for different users. To accomplish this, duplicate PIDs (duplicate entries in the PID table for example) may be used, so a packet may be associated with more than one PID channel. Each channel, at the PSI filter, is preprogrammed with a different match filter and buffer queue address. The PSI filter, after examining the tag for the vector of matches, will test the messages with the match filter assigned to each buffer. If a match is found, the message will be deposited into the buffer. If no match is found, the message is discarded. A message may be deposited into multiple buffers, if multiple matches are found.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A method for processing information, comprising:
   (a) determining if a first identifier associated with the information is stored in an identifier table;
   (b) extracting data associated with said first identifier if said first identifier is stored in said identifier table;
   (c) assigning a second identifier to the information;
   (d) determining a type of processing that is required using said second identifier; and
   (e) performing said type of processing on the information.

2. The method of claim 1, further comprising repeating steps (a) through (e) in a repetitive manner.

3. The method of claim 1, further comprising:
   (f) determining if there is any other information to be processed; and
   (g) terminating the method if there is no other information to be processed.

4. The method of claim 1, further comprising receiving the information.

5. The method of claim 4, further comprising receiving the information from at least one input band.

6. The method of claim 1, wherein the information comprises at least one packet of data.

7. The method of claim 1, wherein said first identifier is a program identifier.

8. The method of claim 1, wherein said second identifier is a unique tag.

9. The method of claim 1, further comprising indicating what processing is required using only said second identifier.

10. The method of claim 1, wherein said type of processing comprises at least one of at least encrypting, decrypting, filtering or buffering.

11. A method for processing at least one data packet using a data processor, comprising:
   (a) receiving the at least one data packet from at least one input band;
   (b) determining if a packet identifier associated with the data packet is stored in an identifier table;
   (c) extracting information associated with said packet identifier if said packet identifier is stored in said identifier table;
   (d) assigning a unique tag to the data packet;
   (e) communicating said unique tag to at least one processing block;
   (f) determining if processing of the data packet is required using said unique tag;
   (g) determining a type of processing that is needed based only on said unique tag; and
   (h) performing said type of processing.

12. The method of claim 11, further comprising repeating steps (a) through (h) in a repetitive manner.

13. The method of claim 11, further comprising:
   (i) determining if there is any more data packets to be processed; and
   (j) terminating the method if there are no more data packets to be processed.

14. The method of claim 11, wherein said type of processing comprises at least one of at least encrypting, decrypting, filtering or buffering.

15. The method of claim 1, comprising performing error checking on said information.

16. The method of claim 11, comprising performing error checking on the at least one data packet.

17. A method for processing at least one data packet using a data processor, comprising:
   (a) receiving at least two transport streams; and
   (b) processing the at least one data packet from said two transport streams, comprising:
      (1) determining if a packet identifier associated with the at least one data packet is acceptable;
      (2) assigning a tag to the at least one data packet;
      (3) communicating said tag to at least one processing block;
      (4) determining if processing of the at least one data packet is required using said tag;
      (5) determining a type of processing that is required using said tag; and
      (6) performing said type of processing.

18. The method of claim 17 wherein said two transport streams comprise independent serial transport streams.

19. The method of claim 17 wherein said two transport streams comprise at least one in-band and one out-of-band stream.

* * * * *